United States Patent Office 3,353,422
Patented Nov. 21, 1967

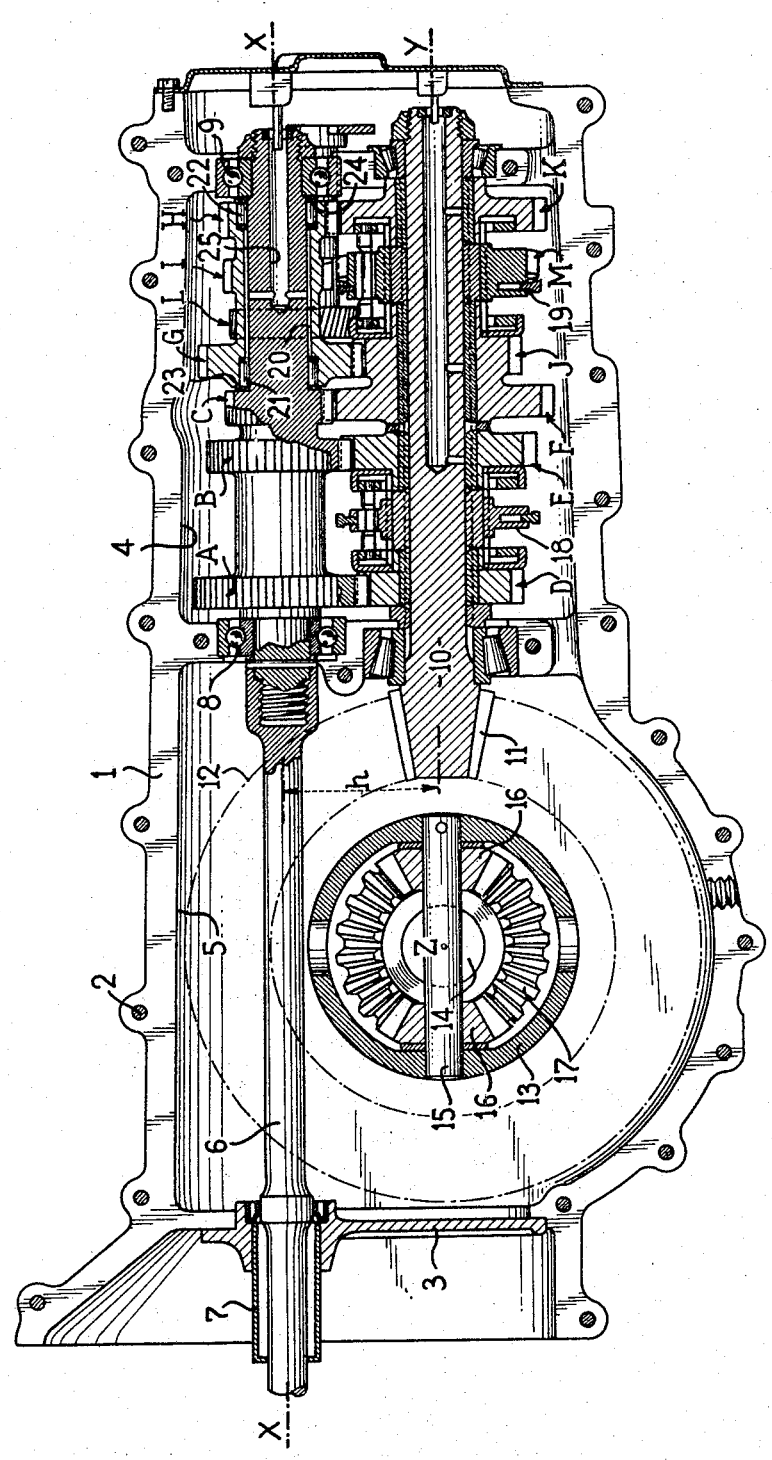

3,353,422
GEAR BOX
Marcel Dangauthier, Paris, France, assignor to La Publicite Francaise, Paris, France, a corporation of France
Filed May 12, 1965, Ser. No. 455,224
Claims priority, application France, June 15, 1964, 978,270
6 Claims. (Cl. 74—375)

ABSTRACT OF THE DISCLOSURE

Gear box having incorporated counter gears and differential and comprising an input shaft and an output shaft which are parallel and spaced from each other, wherein the kinematic train for the first forward speed comprises: a driving pinion rigid with the input shaft, a driven pinion rotatably mounted on the output shaft, a gearing rotatably mounted on the input shaft and driven by a lateral toothing rigid with said driven pinion, and a first-speed driven pinion which can be coupled with the output shaft through a synchronizer; this arrangement results in reducing the distance between the input shaft and the output shaft axes.

---

The present invention relates to gear boxes or transmissions of known type having incorporated counter gears and differential and more particularly intended for motor vehicles.

In this type of gear box, the input or primary shaft of the box and the secondary or output shaft which drives the differential are parallel to each other and the primary shaft extends above the differential, the distance between the axis of the primary shaft and the axis of the two output shafts of the differential being equal to the distance between the primary shaft and the secondary shaft when the latter drives the ring gear rigid with the planet gear carrier of the differential through bevel counter gears.

In this type of gear box, the various speed changes are obtained by sets of gears carried by the two shafts.

Although there is no problem as concerns the gear ratios corresponding to the second speed and higher speeds, this is not so in respect of the gear ratio of the first speed, at any rate if it is desired to have a particularly geared-down first speed, since this necessitates a large difference between the diameters of the two gear elements respectively carried by the two shafts and consequently a relatively large distance between the primary shaft and the output shafts of the differential. Briefly, the gear box has a relatively large vertical extent.

The object of the present invention is to remedy this drawback or, in other words, to reduce the vertical extent of the gear box by reducing the distance between the primary shaft and secondary shaft axes while both affording a high gearing down of the first speed and still driving the differential through a bevel counter gear which is easy to produce.

This is achieved owing to the fact that there is freely mounted on the primary or input shaft of the gear box a gearing which is driven by the driven pinion of the second speed mounted on the secondary shaft and which meshes with the driven pinion of the first speed also mounted on the secondary shaft and with an intermediate reverse speed gear.

Owing to this gearing, the gearing down ratios of the first speed and reverse speed can be considerable while having a minimum value in respect of the distance between the axes of the two shafts.

Further features and advantages of the invention will be apparent from the ensuing description with reference to the accompanying drawing to which the invention is in no way limited.

The figure of the drawing is a longitudinal sectional view of an improved gear box according to the invention.

In the illustrated embodiment, the gear box comprises a case composed of two half-shells merely the shell 1 of which is shown in the drawing, these two half-shells being united in the plane of the figure and held assembled by bolts 2.

The case is closed at the forward end by an attached wall 3 and forms two housing, namely a housing 4 for the change gear mechanism and a housing 5 receiving the differential.

The gear box comprises an input or primary shaft 6 having an axis X—X and extending through the wall 3, a sealing device 7 being interposed between the shaft and said wall and the shaft being journalled in bearings 8 and 9. The shaft 6 drives through a change gear mechanism (which will be described hereinafter) a secondary or output shaft 10 whose axis Y—Y is parallel to the axis X—X and is located at a distance $h$ below the latter axis.

The output shaft 10 carries a bevel pinion 11 which meshes with the ring bevel gear 12 of the differential disposed in the housing 5. This differential is of conventional type and the gear 12 is connected to the planet gear carrier 13 which is journalled laterally on the bearing faces of two output half-shafts, only one of which is shown at 14. These half-shafts have a common axis Z—Z which is perpendicular to the axis Y—Y and is consequently located at the same distance $h$ from the axis X—X.

The planet gear carrier comprises at least one journal 15 on which are mounted the planet gears 16 which mesh with two sun gears one of which is seen at 17. These sun gears are keyed respectively to the two half-shafts 14.

The illustrated change gear mechanism is provided for four gear ratios for the forward speed and one ratio for the reverse speed. These speeds are obtained by sets of gears and under the following conditions.

Machined on or keyed to the primary shaft are three driving pinions A, B, C which respectively mesh with driving pinions D, E, F freely mounted on the secondary shaft 10. The gear train A–D corresponds to the fourth speed, the gear train B–E to the third speed and the gear train C–F to the second speed as concerns the forward speeds.

The driven pinions D, E, F are freely mounted on the secondary shaft 10 and can be rendered rigid therewith by a synchronizer 18 for the fourth and third speeds or by a synchronizer 19 for the second and first speeds.

The assembly just described is identical to that of known type.

The gear box according to the invention differs from known gear boxes in respect of the small value of the vertical distance $h$ and the means affording the first forward speed and the first reverse speed.

Said means comprise a gearing 20 freely mounted on the primary shaft with, for example, interposition of needle bearings 21, 22 and abutment rings 23, 24, the lubrication being achieved by way of a central bore 25 in the primary shaft.

Machined on this gearing are three gear pinions G, H, I.

The pinion G meshes with a lateral toothing J which is rigid with the pinion F of the second speed with regard to rotation.

The pinion H meshes with a pinion K of the first speed which is freely mounted on the secondary shaft and is capable of being rendered rigid therewith by the synchronizer 19.

The pinion I meshes with a sliding pinion L for the reverse speed capable of being meshed with the pinion I and with driven pinion M on the synchronizer 19.

With this transmission, the first speed is obtained from the primary shaft 6 by the following kinematic train: pinion C, pinions F and J, pinion G of the gearing 20, pinion H of this gearing and pinion K rendered rigid with the driven shaft 10 by the synchronizer 19.

As concerns reverse speed, it is obtained by the following kinematic train: pinion C, pinions F and J, pinion G of the gearing 20, pinion I of the latter, sliding pinion L engaged with the pinion I and the driven pinion M of the synchronizer 19 meshing with the intermediate sliding pinion L.

If it is assumed that $a, b \ldots l, m$ are the numbers of teeth of the various pinions A to M and that, for example, $a=31$, $b=25$, $c=18$, $d=29$, $e=35$, $f=43$, $g=31$, $h=20$, $i=21$, $j=30$, $k=41$, $l=25$, $m=41$, ratios are obtained shown by the following table which also shows the percentages of each speed relative to the fourth speed.

| Speeds | Ratios | Percent relative to the fourth speed |
|---|---|---|
| 1st | $\frac{c}{f} \cdot \frac{i}{g} \cdot \frac{h}{k} = \frac{18}{43} \cdot \frac{30}{31} \cdot \frac{20}{41} = 0.19761$ | 18.48 |
| 2nd | $\frac{c}{f} = \frac{18}{43} = 0.4186$ | 39.16 |
| 3rd | $\frac{b}{e} = \frac{25}{35} = 0.71428$ | 66.82 |
| 4th | $\frac{a}{d} = \frac{31}{29} = 1.06896$ | 100 |
| Reverse Speed | $\frac{c}{f} \cdot \frac{i}{g} \cdot \frac{1}{l} \cdot \frac{1}{m} = \frac{18}{43} \cdot \frac{30}{31} \cdot \frac{21}{25} \cdot \frac{25}{41} = 0.20749$ | 19.41 |

Everything else being equal, and in respect of the same ratios, the distance between the axes $h$ that the described arrangement renders possible is 83 mm. whereas with a conventional arrangement without the counter gear a minimum distance between the axes of 100 mm. would be necessary. Consequently, a saving in height of the gear box of about ⅕ is achieved.

Although specific embodiments of the invention have been described, many modifications and changes may be made therein without departing from the scope of the invention as defined in the appended claims.

Having now described my invention what I claim as new and desire to secure by Letters Patent is:

1. Gear box having incorporated counter gears and differential, and comprising: an input shaft, an output shaft parallel to said input shaft and spaced therefrom and driving the differential through said counter gears, a second-speed driving pinion rigid with said input shaft, a gearing having three gear pinions and rotatably mounted on said input shaft, a first-speed driven pinion rotatably mounted on said output shaft and in constant meshing engagement with one gear pinion of said gearing, a second-speed driven pinion rotatably mounted on said output shaft and in constant meshing engagement with said second-speed driving pinion, said second-speed driven pinion having rigid therewith a lateral toothing in constant meshing engagement with another of said gear pinions of said gearing.

2. Gear box as claimed in claim 1, further comprising: a synchronizer, for the first and second speeds, mounted on said output shaft and carrying a reverse-speed driven pinion, and a sliding intermediate pinion capable of being placed in meshing engagement with said reverse-speed driven pinion and with the third of said gear pinions of said gearing.

3. Gear box having incorporated counter gears and differential, said differential having a ring gear drivingly connected with axle shafts, and comprising an input shaft, an output shaft, the axis of rotation of said output shaft being spaced from the axis of rotation of said input shaft, a gearing element mounted coaxially on said input shaft and journalled for rotation relative to said input shaft, a second speed drive pinion secured on said input shaft, a first pinion integral with said gearing element, a transfer gear mounted coaxially on said output shaft for rotation relative thereto, said transfer gear including pinions rigidly secured together and in driving engagement with said second-speed pinion and first pinion, a second pinion integral with said gearing element, a driven pinion mounted coaxially on said output shaft for rotation relative thereto, said second pinion being in driving engagement with said driven pinion, clutch means on said output shaft for selectively engaging said driven pinion with said output shaft, and a bevel pinion on said output shaft in engagement with said ring gear.

4. The gear box according to claim 3 wherein said output shaft axis intersects the axis of said axle shafts.

5. The gear box according to claim 3 wherein the gear ratio between said second speed drive pinion and said first pinion substantially reduces the speed of said gearing element relative to said input shaft.

6. The gear box according to claim 5 wherein the gear ratio between said second pinion and said driven pinion substantially reduces the speed of said output shaft relative to said gearing element.

References Cited

UNITED STATES PATENTS

| | | | |
|---|---|---|---|
| 3,115,048 | 12/1963 | Cape | 74—333 |
| 3,192,788 | 7/1965 | Fodrea | 74—375 |
| 3,202,005 | 8/1965 | Ivanchich | 74—333 |
| 3,245,278 | 4/1966 | Mattausch | 74—333 |

MILTON KAUFMAN, *Primary Examiner.*

DAVID J. WILLIAMOWSKY, *Examiner.*

C. J. HUSAR, *Assistant Examiner.*